United States Patent Office 2,855,442
Patented Oct. 7, 1958

2,855,442

NITROETHYLENES

Dale N. Robertson, Midland, Mich., assignor to The Dow Chemical Company, Midland, Mich., a corporation of Delaware No Drawing. Application October 18, 1956
Serial No. 616,653

6 Claims. (Cl. 260—645)

This invention relates to nitroethylenes having the structure

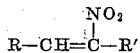

In this and succeeding formulae, R represents an aryl radical of the naphthalene series and R' represents an aryl radical of the benzene series. By "aryl radical of the naphthalene series" is meant 1- and 2-naphthyl radicals and substituted naphthyl radicals such as 5-bromo-2-naphthyl-, 4,8-dimethoxy-1-naphthyl-, 5-bromo-8-nitro-1-naphthyl-, 6-bromo-2-methoxy-1-naphthyl-, 3-methoxy-2-naphthyl-, 5-chloro-6-methoxy-2-naphthyl-, 2,3-dimethyl-1-naphthyl-, 5-nitro-1-naphthyl-, 8-nitro-1-naphthyl-, 1,4-dimethoxy-2-naphthyl-, 6-chloro-1-naphthyl-, 4,8-dimethoxy-1-naphthyl-, 2-ethoxy-1-naphthyl-, and 2,4-dinitro-1-naphthyl-. The expression "aryl radical of the benzene series" refers to phenyl and substituted phenyl radicals such as 3-nitrophenyl-, 2-chlorophenyl-, 4-bromophenyl-, 2,4-dimethylphenyl-, 4-ethoxyphenyl-, 2-bromophenyl-, 4-phenylphenyl-, 2-fluorophenyl-, 4-methoxyphenyl- and 3-chlorophenyl-.

The products of this invention are yellow or orange-colored crystalline solids soluble in organic solvents such as ethanol, acetone, xylene and kerosene and substantially insoluble in water and 10 percent aqueous sodium hydroxide solution. The products are useful as toxic ingredients in compositions adapted to be employed for the control of bacteria and fungi such as in germicidal soap compositions and in the preservation of cellulosic textiles. They are also useful as agricultural chemicals and as insecticides. In addition, these compounds are useful as chemical intermediates.

The products of this invention may be prepared by the reaction of (1) a Schiff base having the structure

R—CH=NR'' wherein R'' is a lower alkyl radical containing from 3 to 6 carbon atoms, inclusive, with (2) a nitromethane compound having the structure

The Schiff base reactant may be prepared by condensing an appropriate aldehyde having the formula

RCHO with a primary amine having the formula

R''NH$_2$ wherein R and R'' are as above defined. It is convenient to prepare the Schiff base as a first step in the synthesis of the nitroethylene.

In the preferred method for carrying out this reaction, the aldehyde and a primary alkyl amine, such as normal-butylamine, are mixed in a water-immiscible organic solvent such as benzene or cyclohexane. Good results are obtained when substantially equimolar quantities of the reactants or a slight excess of the amine are employed. The resulting mixture is heated to distill out the water of reaction substantially as formed as an azeotropic mixture. After completion of the reaction, the remaining solvent and excess amine, if employed, are removed by distillation and the Schiff base recovered as residue. The latter may be purified by conventional means, if desired.

In the second step of the reaction, the Schiff base and the nitromethane compound are mixed together in a substantially anhydrous lower alkanoic acid such as acetic, propionic or butyric acid. Substantially equimolar proportions of the Schiff base and nitromethane compound and a molar excess of the alkanoic acid are employed. The preferred excess of the acid is from 2 to 3 molar excess. The resulting mixture is allowed to stand at room temperature, i. e., from about 20°—40° C. to allow the reaction to proceed. The reaction is usually substantially complete in several hours but the mixture may be allowed to stand for several days without detriment. The product frequently precipitates in the reaction mixture. However, a supersaturated solution of the product may be formed and scratching the reaction vessel or seeding the mixture may be necessary to initiate precipitation. Alternatively, the entire mixture may be poured into water to precipitate the desired product.

The following examples illustrate the invention but are not to be construed as limiting:

*Example 1.*—*1-(β-nitrostyryl)naphthalene*

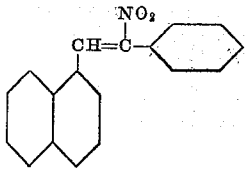

15 grams (0.1 mole) of 1-naphthaldehyde, 10 milliliters (0.1 mole) of normal-butylamine and 50 milliliters of benzene are mixed together and the resulting mixture heated to distill off the water of reaction as a benzene-water azeotrope. The remaining benzene is distilled out under reduced pressure to obtain an N-(1-naphthylidene)-normal-butylamine product as residue.

13.7 grams (0.1 mole) of phenylnitromethane and 20 milliliters of glacial acetic acid are added to the above residue and the resulting mixture stirred. An exothermic reaction takes place. The mixture is placed in the dark and allowed to stand overnight to obtain a yellow crystalline solid 1-(β-nitrostyryl)naphthalene product. The latter is filtered from the mixture and recrystallized from ethanol to obtain a purified product melting at 122°—122.5° C. The yield of the first crop of the recrystallized product is 18.9 grams or 68.7 percent of theoretical.

*Example 2.*—*2-(β-nitrostyryl)naphthalene*

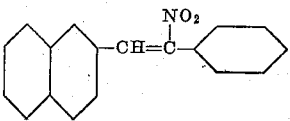

15 grams (0.1 mole) of 2-naphthaldehyde, 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(2-naphthylidene)-normal-butylamine product as residue.

13.7 grams (0.1 mole) of phenylnitromethane and 20 milliliters of glacial acetic acid are added to the above residue and the resulting mixture is stirred. An exothermic reaction takes place. The mixture is placed in the dark and allowed to stand overnight to obtain a yellow crystalline solid. The latter is filtered from the mixture and purified to obtain a 2-(β-nitrostyryl)naphthalene product having a molecular weight of 275.

*Example 3.—5-bromo-1-(β-nitrostyryl)naphthalene*

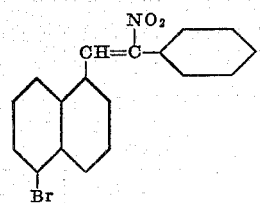

23.5 grams (0.1 mole) of 5-bromo-1-naphthaldehyde, 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(5-bromo-1-naphthylidene)-normal-butylamine product as residue.

13.7 grams (0.1 mole) of phenylnitromethane and 20 milliliters of glacial acetic acid are added to the above residue and the resulting mixture stirred and allowed to stand overnight in the dark to precipitate a yellow solid product. The latter is filtered from the mixture to obtain a 5-bromo-1-(β-nitrostyryl)naphthalene product having a molecular weight of 354.2.

*Example 4.—5-bromo-8-nitro-1-(β-nitrostyryl)naphthalene*

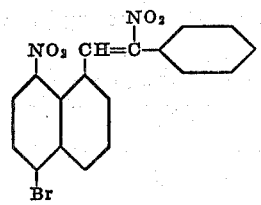

28.0 grams (0.1 mole) of 5-bromo-8-nitro-1-naphthaldehyde, 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(5-bromo-8-nitro-1-naphthylidene)-normal-butylamine product as residue.

13.7 grams (0.1 mole) of phenylnitromethane and 20 milliliters of glacial acetic acid are added to the above residue and the resulting mixture stirred and allowed to stand overnight in the dark to precipitate a yellow solid product. The latter is filtered from the mixture to obtain a 5-bromo-8-nitro-1-(β-nitrostyryl)naphthalene product having a molecular weight of 399.2.

*Example 5.—1-(2-chloro-β-nitrostyryl)-2,7-dimethoxynaphthalene*

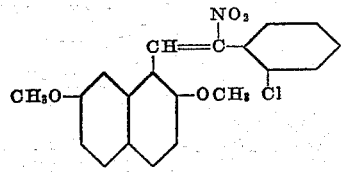

21.6 grams (0.1 mole) of 2,7-dimethoxy-1-naphthaldehyde, 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(2,7-dimethoxy-1-naphthylidene)-normal-butylamine product as residue.

17.2 grams (0.1 mole) of 2-chlorophenylnitromethane and 25 milliliters of glacial acetic acid are added to the above residue and the resulting mixture stirred and allowed to stand overnight in the dark to precipitate a solid product. The latter is filtered from the mixture to obtain a 1-(2-chloro-β-nitrostyryl)-2,7-dimethoxynaphthalene product having a molecular weight of 369.8.

*Example 6.—1-(2-fluoro-β-nitrostyryl)-8-nitronaphthalene*

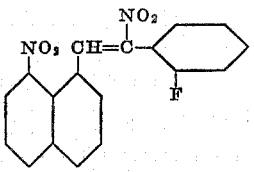

20.1 grams (0.1 mole) of 8-nitro-1-naphthaldehyde and 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(8-nitro-1-naphthylidene)-normal-butylamine product as residue.

15.5 grams (0.1 mole) of 2-fluorophenylnitromethane and 25 milliliters of glacial acetic acid are added to the above residue and the resulting mixture stirred and allowed to stand overnight in the dark to precipitate a solid product. The latter is filtered from the mixture to obtain a 1-(2-fluoro-β-nitrostyryl)-8-nitronaphthalene product having a molecular weight of 338.3.

*Example 7.—4-chloro-1-(4-nitro-β-nitrostyryl)naphthalene*

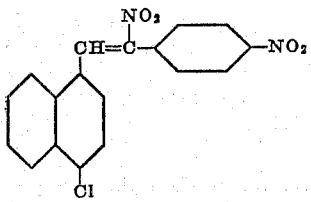

19.1 grams (0.1 mole) of 4-chloro-1-naphthaldehyde, 10 milliliters (0.1 mole) of normal-butylamine and 75 milliliters of benzene are mixed together and the resulting mixture heated to distill off the water of reaction as a benzene-water azeotrope. The remaining benzene is distilled out under reduced pressure to obtain an N-(4-chloro-1-naphthylidene)-normal-butylamine product as residue.

18.2 grams (0.1 mole) of 4-nitrophenylnitromethane and 25 milliliters of glacial acetic acid are added to the above residue and the resulting mixture stirred and allowed to stand overnight in the dark to precipitate a solid product. The latter is filtered from the mixture to obtain a 4-chloro-1-(4-nitro-β-nitrostyryl)naphthalene having a molecular weight of 354.8.

In similar preparations the following nitroethylenes are prepared:

2-(4-chloro-β-nitrostyryl)-6-methoxynaphthalene having a molecular weight of 339.8 by the reaction of 6-methoxy-2-naphthaldehyde with normal-propylamine to obtain N-(6-methoxy-2-naphthylidene)-normal-propylamine followed by the reaction of the latter with 4-chlorophenylnitromethane.

2-(4-bromo-β-nitrostyryl)-5-chloro-6-methoxynaphthalene having a molecular weight of 418.7 by the reaction of 5-chloro-6-methoxy-2-naphthaldehyde with normal-butylamine to obtain an intermediate N-(5-chloro-6-methoxy-2-naphthylidene)-normal-butylamine followed by the reaction of the latter with 4-bromophenylnitromethane.

4-methyl-1-(3-nitro-β-nitrostyryl)naphthalene having a molecular weight of 334.3 by the reaction of 4-methyl-1-naphthaldehyde with normal-amylamine to obtain an N-(4-methyl-1-naphthylidene)-normal-amylamine intermediate followed by the reaction of the latter with 3-nitrophenylnitromethane.

1-(3-bromo-β-nitrostyryl)-2-methoxy-6-nitronaphthalene having a molecular weight of 413.2 by the reaction of 2-methoxy-6-nitro-1-naphthaldehyde with normal-butylamine to obtain an N-(2-methoxy-6-nitro-1-naphthylidene)-normal-butylamine intermediate followed by the reaction of the latter with 3-bromophenylnitromethane.

The products of this invention are useful for the control of bacterial and fungal organisms. In a representative operation, 1-(β-nitrostyryl)naphthalene was added to nutrient agar media to give a saturated solution and the media streaked with *Penicillium digitatum* and incubated at 30° C. for three days. At the end of this period, complete inhibition of growth of the organism was observed.

The products are also useful as toxicants in germicidal preparations. In a representative operation, a germicidal soap preparation was made by adding 1-(β-nitrostyryl)naphthalene to a 5 percent soap solution to give a concentration of 0.025 percent. The resulting solution was inoculated with *Staphylococcus aureus* and incubated for 4 hours at 37° C. At the end of this period, nutrient agar slants were swabbed with the inoculated soap solution and incubated for 24 hours at 37° C. On examination of the slants at the end of this period, no bacterial growth was observed.

A preferred method for the preparation of these compounds is disclosed and claimed in a copending application Serial No. 616,652, filed concurrently herewith, in the name of Dale N. Robertson.

Certain of the Schiff bases employed in the synthesis of the nitroethylenes of the present invention are described and claimed in a copending application of Dale N. Robertson, filed concurrently herewith as Serial No. 616,659.

The nitromethane compounds employed as starting materials in the preparation of the nitroethylenes of this invention may be prepared by reacting an appropriate benzyl bromide having the structure $$R'CH_2Br$$

with sodium nitrite in a solvent such as dimethylformamide at a temperature of from —20° to —15° C. for several hours. The fluorophenylnitromethanes employed in the preparation of certain of the nitroethylenes of the present invention are described and claimed in a copending application by Dale N. Robertson, filed concurrently herewith as Serial No. 616,655.

I claim:
1. A nitroethylene having the structure

$$R-CH=\overset{NO_2}{\underset{|}{C}}-R'$$

wherein R represents an aryl radical of the naphthalene series consisting of naphthyl and substitued naphthyl radicals wherein the substituent is at least one of a group consisting of lower alkoxy, lower alkyl, nitro and halo; and R' represents an aryl radical of the benzene series consisting of phenyl and substituted phenyl radicals wherein the substituent is at least one of a group consisting of nitro, halo, phenyl, lower alkyl and lower alkoxy.
2. 1-(β-nitrostyryl)naphthalene.
3. 2-(β-nitrostyryl)naphthalene.
4. 5-bromo-1-(β-nitrostyryl)naphthalene.
5. 1-(2-fluoro-β-nitrostyryl)-8-nitronaphthalene.
6. 4-chloro-1-(4-nitro-β-nitrostyryl)naphthalene.

No references cited.